United States Patent [19]
Teramachi

[11] Patent Number: 5,121,647
[45] Date of Patent: Jun. 16, 1992

[54] COMPOSITE MOTION GUIDING UNIT AND COMPOSITE MOTION GUIDING APPARATUS INCORPORATING SAME

[76] Inventor: Hiroshi Teramachi, 5-6-10, Higashi-Gotanda, Shinagawa-ku, Tokyo, Japan

[21] Appl. No.: 584,764

[22] Filed: Sep. 19, 1990

Related U.S. Application Data

[63] Continuation-in-part of Ser. No. 497,807, Mar. 21, 1990, abandoned, which is a continuation of Ser. No. 169,405, Mar. 17, 1988, abandoned.

[30] Foreign Application Priority Data

Mar. 18, 1987 [JP] Japan .................. 62-61083

[51] Int. Cl.⁵ ........................................ F16H 25/22
[52] U.S. Cl. ........................ 74/89.15; 74/424.8 R; 74/459; 384/551; 384/563
[58] Field of Search ............... 74/89.15, 424.8 R, 459; 384/43, 517, 551, 563

[56] References Cited

U.S. PATENT DOCUMENTS 4,205,885  6/1980  Ernst et al. ................. 384/43
4,939,946  7/1990  Teramachi ................. 74/89.15

FOREIGN PATENT DOCUMENTS 3244508  6/1984  Fed. Rep. of Germany ..... 74/424.8 R
62-49070  3/1987  Japan ....................... 74/424.8 R
62-165057  7/1987  Japan ....................... 74/424.8 R Primary Examiner—Richard Lorence
Assistant Examiner—William O. Trousdell
Attorney, Agent, or Firm—Kenyon & Kenyon

[57] ABSTRACT

A composite motion guiding unit comprises a shaft provided with helical ball screw grooves formed in the outer peripheral surface thereof and ball spline grooves formed in the outer peripheral surface thereof so as to extend in the axial direction of the shaft across the ball screw grooves and a ball screw nut and a ball spline outer cylinder both mounted on the shaft to be engageable with the ball screw grooves and ball spline grooves respectively through a number of balls. The ball screw nut and the ball spline outer cylinder are both supported by a housing to be rotatable through bearings and are driven by driving means to rotate the same, thus constituting a composite motion guiding apparatus. The ball screw grooves and the ball spline grooves have depths equal to each other.

4 Claims, 4 Drawing Sheets

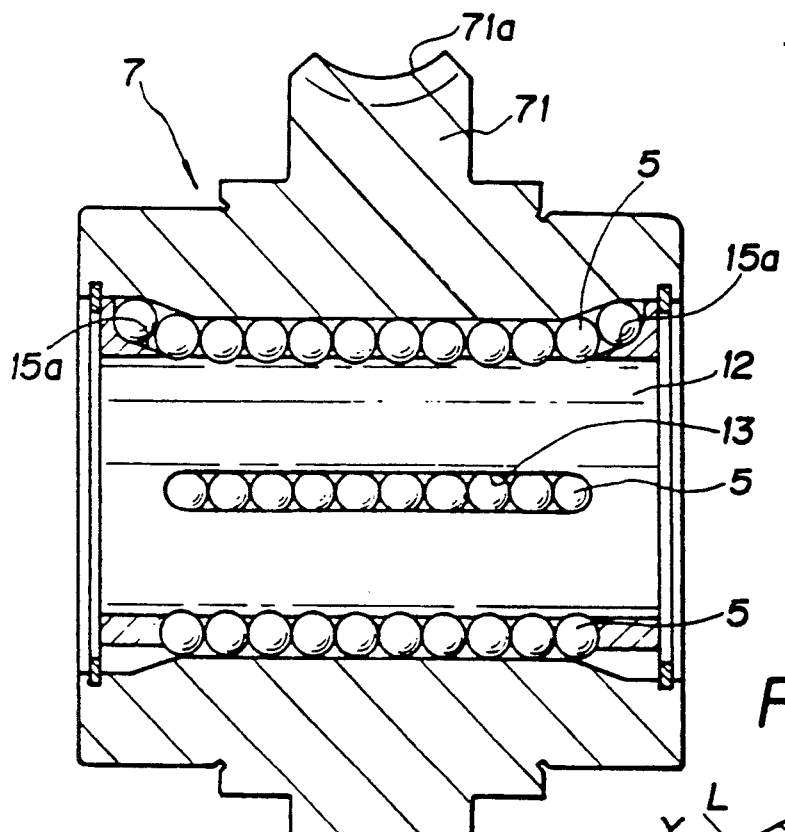
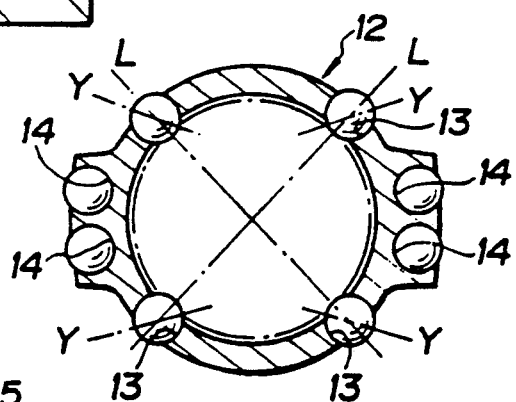
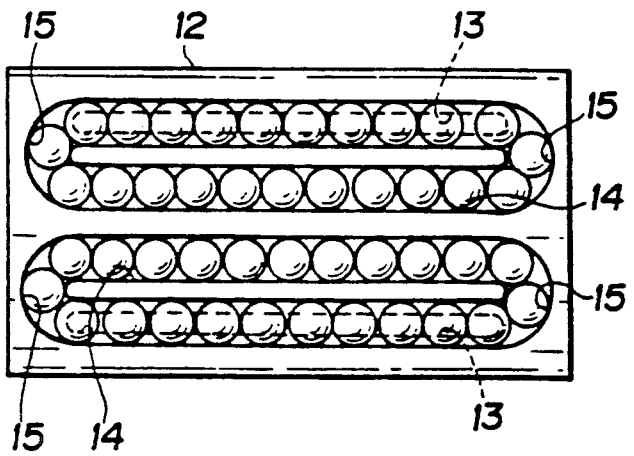
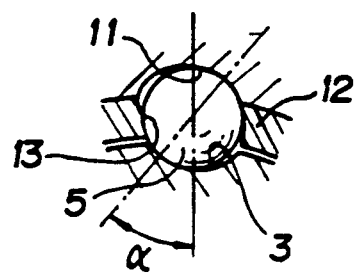

COMPOSITE MOTION GUIDING UNIT AND COMPOSITE MOTION GUIDING APPARATUS INCORPORATING SAME

This application is a continuation-in-part of application Ser. No. 07/497,807 filed Mar. 21, 1990 now abandoned which is a continuation of application Ser. No. 07/169,405 filed Mar. 17, 1988, now abandoned.

BACKGROUND OF THE INVENTION

The present invention relates to a composite motion guiding unit and a composite motion guiding apparatus incorporating the same which are used in an arm of an industrial robot or the like for guiding motions in the axial and rotational directions.

Known motion guiding mechanisms include a ball screw and a ball spline. The ball screw has a shaft with ball screw grooves formed in the outer pheripheral surface thereof in a helical fashion and a nut fitted on the shaft with a large number of balls interposed therebetween so as to reduce any friction generated between the nut and the screw shaft and thereby allow a motion to be transmitted smoothly. The ball spline has a spline shaft with linear ball spline grooves formed in the outer peripheral surface thereof in such a manner that they extend in the axial direction, and an outer cylinder fitted on the spline shaft with a large number of balls interposed therebetween for guiding a linear motion smoothly and at the same time for transmitting torque.

The above-described known ball screw is only capable of changing a rotary motion to a linear motion, and the ball spline only has the function of guiding the linear motion smoothly while transmitting torque. Therefore, if these two functions are required in one apparatus, both the ball screw and the ball spline must be incorporated therein. This increases the number of parts and makes the structure of the device complicated.

A motion guiding mechansm incorporating a shaft body which has ball spline grooves and ball grooves is also known. In such a motion guiding mechanism, however, the ball spline grooves and the ball screw grooves are provided at separate portions of the shaft body, making the shaft body long and the size of the apparatus large. An increase in the length of the shaft body reduces the torsional rigidity, causing a strength-related problem. It also prevents any reduction in the size of the apparatus.

SUMMARY OF THE INVENTION

An object of this invention is to overcome the above-descrived problems of the prior art and to provide a composite motion guiding unit and a composite motion guiding apparatus incorporating the same which can function as a ball screw and a ball spline and which enables the overall size of the unit or apparatus to be reduced.

To achieve the above-descrived object, the present invention provides, in one of its aspects, a composite motion guiding unit which comprises a shaft provided with helical ball screw grooves formed in the outer peripheral surface thereof and ball spline grooves formed in the outer peripheral surface of the shaft so as to extend in the axial direction across the ball screw grooves, and a ball screw nut and a ball spline outer cylinder fitted on the shaft respectively to be engageable with the ball screw grooves and the ball spline grooves through a large number of balls.

The present invention provides, in another of its aspects, a composite motion guiding apparatus which comprises a shaft provided with helical ball screw grooves formed in the outer peripheral surface thereof and ball spline grooves formed in the outer peripheral surface of the shaft so as to extend in the axial direction across the ball screw grooves, a ball screw nut and a ball spline outer cylinder fitted on the shaft respectively to the engageable with the ball screw grooves and ball spline grooves through a large number of balls, a housing to which the ball screw nut and the ball spline outer cylinder are rotatably supported, and first and second drive means for rotating the ball screw nut and the ball spline outer cylinder, respectively.

In one of the aspects of the present invention, the outer cylinder and the shaft in combination function as a ball spline. The nut and the shaft in combination serve as a ball screw. A composite motion such as a rotary and linear motion is possible by utilizing both the outer cylinder and the nut.

In another aspect of the present invention, the shaft is moved back and forth by driving the ball screw nut. On the other hand, the shaft is rotated by driving the ball spline outer cylinder. It is thus made possible for a composite motion of the shaft in which the shaft is moved back and forth while being rotated to be effected by driving first and second driven means concurrently. Further, the speed at which the shaft is moved back and forth can be changed by adjusting to suitable values the amount of rotation of the nut and the outer cylinder effected by the first and second drive means.

In accordance with the present invention, the ball screw grooves and the ball spline grooves have depths equal to each other.

BRIEF DESCRIPTION OF THE DRAWINGS

In the accompanying drawings:

FIG. 2 is a longitudinal sectional view of a ball spline outer cylinder of FIG. 1;

FIG. 3 is a front elevational view of a retainer for the outer cylinder of FIG. 2;

FIG. 4 is a cross-sectional view of the retainer of FIG. 3;

FIG. 5 is a partial enlarged view of a ball retained by the retainer of FIG. 3;

DESCRIPTION OF THE PREFERRED EMBODIMENTS

Figure 1:
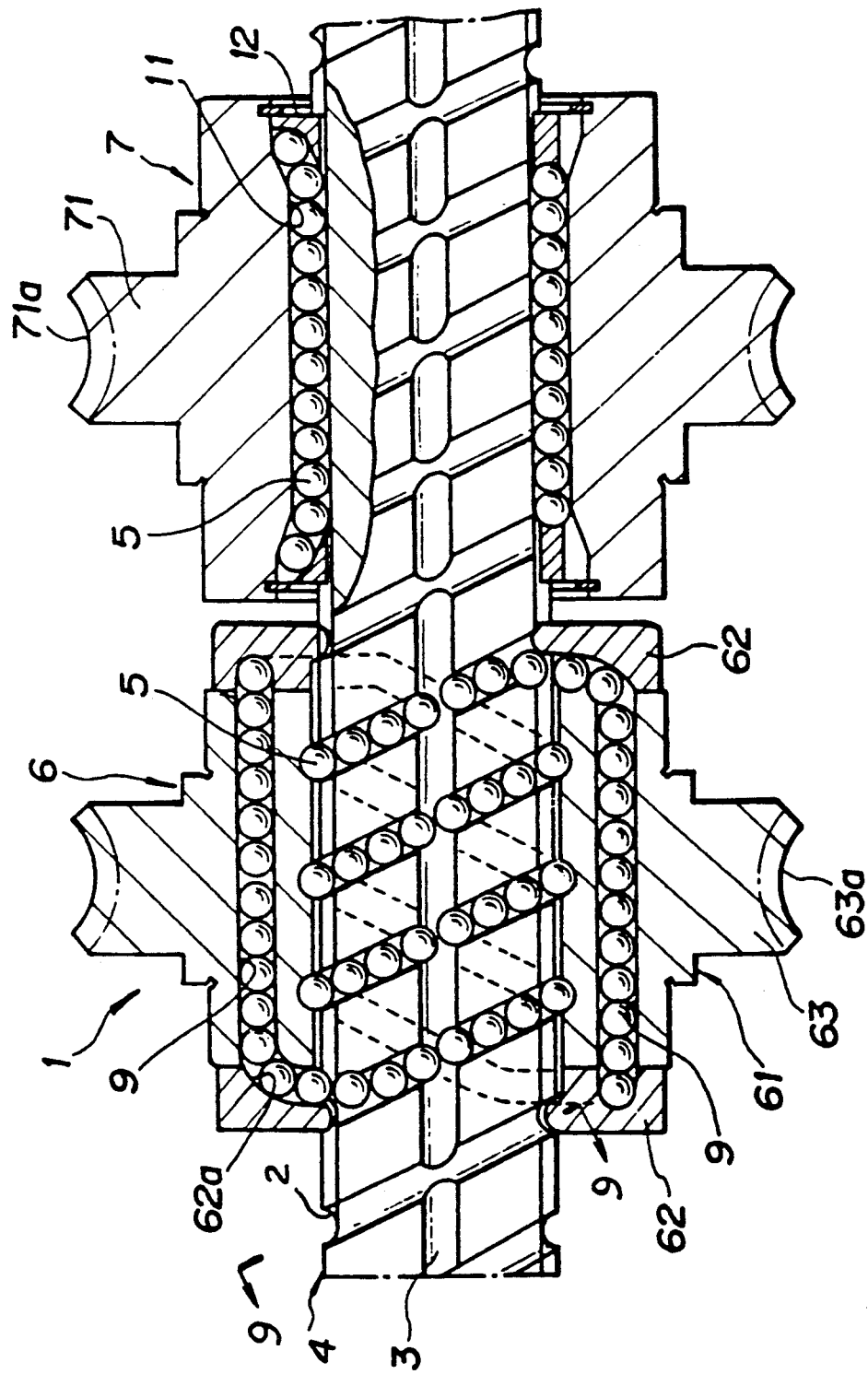
FIG. 1 is a longitudinal sectional view of essential parts of an embodiment of a composite motion guiding unit which forms a first invention.

The present invention will be hereinunder described in detail by way of the preferred embodiments with reference to the accompanying drawings. FIGS. 1 to 5 show a composite motion guiding unit provided in one aspect of the present invention. A composite motion guiding unti 1 is composed of a shaft 4 with ball screw grooves 2 and ball spline grooves 3 formed substantially in the outer peripheral surface thereof, and a ball screw nut 6 and a ball spline outer cylinder 7 fitted on the shaft with a large number of balls 5 interposed therebetween.

Figure 9:
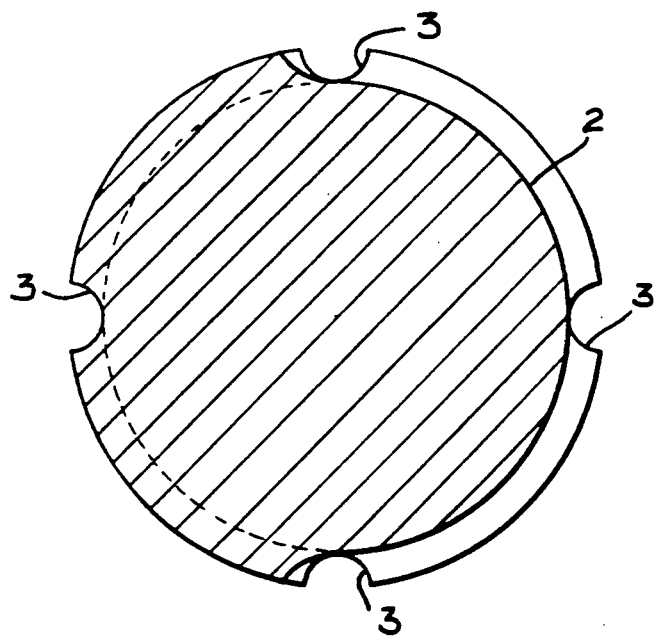
FIG. 9 is a cross-sectional view along line 9—9 of FIG. 1.

The ball screw grooves 2 are provided in the outer peripheral surface of the shaft in a helical fashion over the entire length thereof by a predetermined pitch. The bal spline grooves 3 are formed in straight lines in such a manner that they cross the ball screw groove 3 in an area of the shaft 4 in which the screw groove is formed, i.e., over the entire length of the shaft 4 in this embodiment. The two or more (four in this embodiment) ball spline grooves 3 are disposed at equal intervals in the circumferential direction of the shaft 4. As illustrated in FIG. 9, the depth of the ball screw grooves 2 and the depth of the ball spline grooves 3 are equal to one another. Therefore, rolling balls can smoothly roll across intersections without generating noise.

The ball screw nut 6 has a cylindrical shape. The ball screw nut 6 is composed of a nut body 61 with ball rolling grooves 8 formed in the inner peripheral surface thereof by the same pitch as that of the ball screw grooves 2, and side lid 62 mounted on the two ends of the nut body 61. The nut body 61 has at two locations ball escaping holes 9 each of which forms part of a circulating path of the balls 5 interposed between the nut 6 and the shaft 4. Each of the side lids 62 is provided with direction changing grooves 10 which are adapted to release the balls 5 interposed between the ball screw grooves 2 and the ball rolling grooves 8 of the nut 4 into the ball escaping holes 9. The ball screw grooves 2, the ball rolling grooves 8, the ball direction changing grooves 10, and the ball escaping holes 9 together form ball circulating paths through which the balls are circulated in order. The ball rolling grooves 8 for the nut body 61 are provided with pitch differences, not shown, with respect to the ball screw grooves 2 on the side of the shaft 4 to impart an axial pre-load to the balls 5 to substantially eliminate the axial play in the engagement therewith.

The center of the outer periphey of the nut body 61 is provided with a flange 63 which constitutes a worm wheel. The outer peripheral surface of the flange is toothed to form teeth 63a which engage with a worm.

The ball spline outer cylinder 7 has a cylindrical shape. The inner peripheral surface of the ball spline outer cylinder 7 is provided with ball rolling grooves 11 which are formed in such a manner that they correspond to the ball spline grooves 3 so as to enable the large number of balls 5 to be interposed between the ball rolling grooves 11 of the outer cylinder 7 and the ball spline grooves 3 of the shaft 4. A retainer 13 for guiding the balls 5 is provided on the inner periphery of the outer cylinder 7.

As shown in FIGS. 4 and 5, the loaded balls 5 contact at two points to the ball rolling grooves 11 with a predetermined angle $\alpha$ in a radial direction thereof and a contact angle thereof is set at about 45° in the preferred embodiment. In detail, the ball spline grooves 3 and the ball rolling grooves 11 are both composed of as circular arcuate grooves each having an arcuate cross section. An angle connecting the centers of the curvatures of the adjacent ball spline grooves 3, 3 of the shaft 4 is made larger or smaller than an angle connecting the centers of the curvatures of the ball rolling grooves 11, 11 of the outer cylinder 11, and a contact line Y connecting the contact points of the ball 5 to the ball spline groove 3 and the ball rolling groove 11 intersects with a line L passing the central axis of the shaft 4 and the center of the ball 5 at an angle $\alpha$.

As described above, the contact angle of the ball 5 is inclined in the radial direction, so that the load bearing capability with respect to not only the load in the radial direction but also the load in the rotation direction can be increased and relatively large torque can be transferred under the radial load applied.

Particularly, when the contact angle is set at about 45°, the radial load bearing ability and the torque load bearing ability are most suitably balanced. Moreover, the inclination of the ball 5 in the radial direction can impart a preload in an angular direction with respect to the ball 5 to thereby substantially eliminate the angular backlash. Accordingly, the positioning accuracy in the rotating direction can be improved, and in addition, operational responding ability can also be improved. The noises caused by the angularlash can be substantially eliminated in the operation and the durability of the unit can be improved.

The retainer 12 is cylindrical in shape, and has a thin wall thickness. The retainer 12 has slits 13 which are disposed parallel to the ball spline grooves 3, the slits being defined by parallel opposed curved surfaces for guiding loaded balls. The opposed curved surfaces of the retainer which define the slits are defined by a diameter substantially equal to the diameter of the balls. The outer peripheral surface of the retainer 12 is provided with ball releasing grooves 14 each of which forms part of a ball circulating path. Each end of each of the slits 13 is provided with a ball rolling direction changing groove 15 through which the loaded ball 5 which have been guided along the slit 13 are released into the corresponding ball releasing groove 14 disposed in the outer peripheral surface of the retainer 12. The ball rolling direction changing groove 15 has a U-shaped form. Each end of each of the slits 13 is tapered to form a scooping surface 15a by which the direction of the balls 5 which have come along the slit 13 are smoothly changed.

The center of the outer periphery of the outer cylinder 7 is provided with flange 71 which is formed in such a manner that it protrudes outwardly in the radial direction as in the case of the ball screw nut 6. The outer peripheral surface of the flange 71 is toothed to form teeth 71a.

In the thus-arranged composite motion guiding unit, the ball screw nut 6 and the shaft 4 in combination serve to change a rotary motion to a linear motion. On the other hand, the ball spline outer cylinder 7 and the shaft 4 in combination function to guide a linear motion. The balls 5 interposed between the ball spline outer cylinder 7 and the shaft 4 are guided by the retainer 5.

The balls 5 are held in the loaded section between the outer cylinder 7 and the shaft 4, so that they are free to move in both of the rotational and axial directions of the shaft 4. At the intersections of the ball screw groove 2 and the ball spline grooves 3, grip of the balls 5 by the outer cylinder 7 and the shaft 4 is released. However, they are guided in the rotational direction of the shaft 4 by the retainer 12, so that balls 5 are roll along the rolling surface of the ball spline grooves 3.

Figure 6:
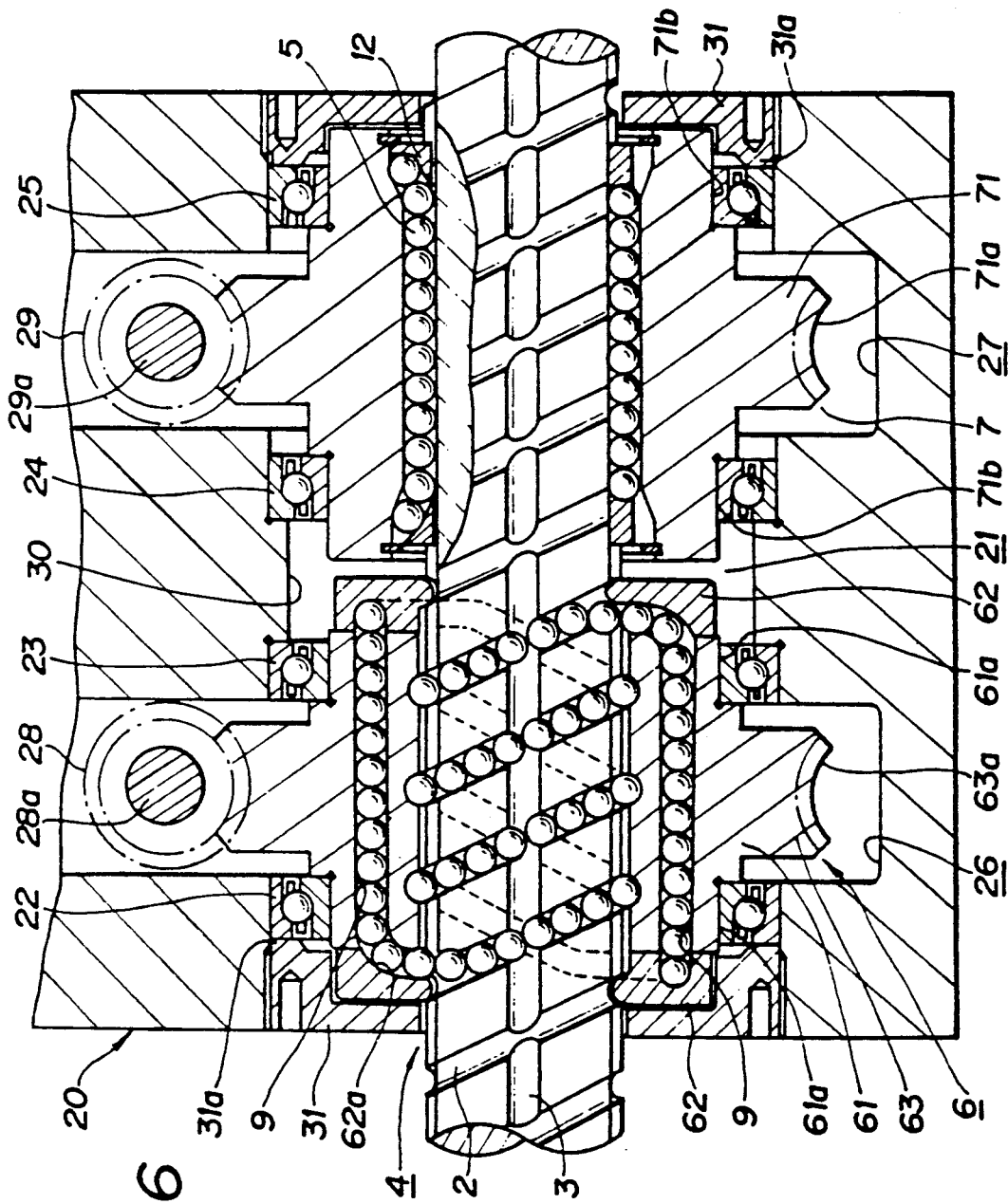
FIG. 6 is a longitudinal sectional view of an embodiment of a composite motion guiding apparatus which forms a second invention.

FIG. 6 shows a composite motion guiding apparatus provided in another aspect of the prevent invention. In this embodiment, the composite motion guiding unit 1 described with reference to FIGS. 4 through 5 is supported by a housing 20 which serves as a support member. The housing 20 is provided with a hole 21 through which the shaft 4 is inserted. Both of the ball screw nut 6 and the ball spline outer cylinder 7 are rotatably mounted on the inner periphery of the hole 21 through bearings 22, 23, 24, and 25. The ball screw nut 6 and the ball spline outer cylinder 7 are disposed as close to each other a possible in the axial direction of the shaft so as to enable the size of the apparatus to be reduced. The inner periphery of the hole 21 the housing 20 is provided with annular recesses 26 and 27 which accommodate the flanges 63 and 71 protruding from the outer peripheries of the nut 6 and the outer cylinder 7, respectively. Worm gears 28 and 29 which respectively engage with the teeth 63a and 71a formed on the flanges 61 and 71 of the nut 6 and the outer cylinder 7 are housed in the upper portions of the recesses 26 and 27. The worm gears 28 and 29 are each disposed perpendicular to the shaft 4, and are coupled to motors (not shown) through shafts 28a and 29a. The motors and the worm gears 28 and 29 together form a driving means.

The ball screw nut 6 is supported to the housing 20 by the pair of bearings 22 and 23 disposed at the two ends of the outer periphery of the nut body 61 in the axial direction. The bearings 22 and 23 are a face-to-face pair type angular-contact bearing. The inner races of the bearings 22 and 23 are engaged with shoulders 61a formed at the two ends of the outer periphery of the nut body 61, while the outer races of the bearings 22 and 23 are fitted to the inner periphery of the hole 21 of the housing 20. Like the ball screw nut 6, the ball spline outer cylinder 7 is also supported to the housing 20 by the pair of bearings 24 and 25 which is a face-to-face pair type angular-contact bearing. The outer periphery of the ball spline outer cylinder 7 is provided with shoulders 71b to which the bearings 24 and 25 are fitted. The inner periphery of the hole 21 of the housing 20 is provided with a protrusion 30 which positions the bearings 23 and 24 for supporting the nut 6 and the outer cylinder 7 at the inner sides thereof. This causes the bearings 23 and 24 to abut against the two ends of the protrusion 30 in the axial direction. respectively, enabling the nut 6 and the outer cylinder 7 to be separated from each other by a fixed gap.

A mounting nut 31 is fitted to each end of the inner periphery of the hole 21 by screws. The mounting nuts 31 are each provided with a very small gap formed between the inner peripheral surface thereof and the outer peripheral surface of the shaft 4 so as to enable prevention of dust entering the hole 21 of the housing 20. The outer diameter side edge of each of the mounting nuts 31 is provided with an annular protrusion 31a which abuts against the outer race of the bearing 22 or 25 which is fitted to the ball screw nut 6 or the ball spline outer cylinder 7 and which is disposed on the side of the open end of the hole 21. The protrusions 31a serve to tighten the mounting nuts 31 within the hole 21 of the housing 20 and thereby press through the bearings 22 and 25 the ball screw nut 6 and the ball spline outer cylinder 7 inwardly to impart the pre-load to the balls in the bearings 22 and 25, respectively as if they come close to each other.

In the thus-arranged composite motion guiding apparatus, the shaft can be rotated, moved back and forth, or rotated and moved in a reciprocating manner at the same time by operating either the worm gear 28 for driving the ball screw nut 6 or the worm gear 29 for driving the ball spline outer cylinder 7, or both of them together.

Tables 1 to 3 show the various motions of the shaft 4 which are obtained when the drive derection and the speed of the ball screw nut 6 and the ball spline outer cylinder 7 are combined in various ways.

The relationship between the thread cutting direction of the ball screw grooves 2 and the rotational direction of the nut 6 is set such that the shaft 4 is moved up when the nut 6 is rotated clockwise in a state wherein the shaft 4 is not rotated, and that the shaft 4 is moved down when the nut 6 is rotated counterclockwise. Therefore, if the ball spline outer cylinder 7 is rotated clockwise while the nut 6 is being fixed, the shaft 4 is rotated clockwise, i.e., counterclockwise with respect to the nut 6, moving the shaft 4 down. On the other hand, if the outer cylinder 7 is rotated counterclockwise, the shaft is moved up.

Table 1 shows various motions of the shaft 4 which are obtained when the ball screw nut 6 is rotated clockwise and counterclockwise at various rotational speeds with respect to the outer cylinder 7 while the outer cylinder 7 is being rotated clockwise.

More specifically, if the nut 6 is rotated clockwise in the direction in which the outer cylinder 7 is rotated at a speed lower than that of the outer cylinder 7, the shaft 4 moves down while it is being rotated clockwise. If the nut 6 is rotated at the same speed as that at which the outer cylinder 7 is rotated, the shaft 4 rotates but does not move upward or downward. If the nut 6 is rotated at a speed higher than that of the outer cylinder 7, the shaft 4 moves up while it is being rotated clockwise.

On the other hand, if the nut 6 is rotated counterclockwise in the direction opposite to that in which the outer cylinder 7 is rotated, the shaft 4 moves down at a higher speed while it is being rotated clockwise, even when the nut 6 is rotated at a speed higher or lower than that of the outer cylinder 7.

Furthermore, if the movement of the nut 6 is stopped while the outer cylinder 7 is being rotated clockwise, the shaft 4 moves down while rotating clockwise.

Table 2 shows various motions of the shaft 4 which are obtained when the ball screw nut 6 is rotated clockwise and counterclockwise at various rotational speeds with respect to the outer cylinder 7 while the outer cylinder 7 is being rotated counterclockwise. In this case, if the nut 6 is rotated clockwise, the shaft 4 moves up at high speed while rotating counterclockwise, regardless of the speed of the nut 6 relative to that of the outer cylinder 7. On the other hand, if the nut 6 is rotated counterclockwise in the same direction as that in which the outer cylinder 7 is rotated, the shaft moves up or down or is stopped depending on any difference in the speeds at which the nut 6 and the outer cylinder 7 are rotated.

Table 3 shows various motions of the shaft 4 obtained when the nut 6 is rotated clockwise and counterclockwise while the movement of the outer cylinder 7 is stopped. In this case, the shaft moves up or down, as in the case of a normal ball screw.

In addition, it is possible to move the shaft 4 up or down at a fine or rapid feed rate.

Moreover, the ball screw nut 6 and the ball spline outer cylinder 7 are incorporated in and assembled with the common housing 20, and the pre-load is imparted to the bearings 22, 23 and 24, 25 respetively supporting the ball screw nut 6 and the ball spline outer cylinder 7 to improve the rigidity thereof, so that the moment load can be particularly effectively born. The balls 5 incorporated in the ball screw nut 6, the ball spline outer cylinder 7 and the bearings 22 through 25 are all imparted by the pre-load to improve the supporting rigidities thereof, so that the axial play and the play in the rotating direction of these members or units can be substantially eliminated, thus improving the positioning accuracy and the responseness during the operation. The improvement of the rigidity can effectively prevent the local wears or breakings of the balls which may be caused by the play referred to above, thus improving the durability thereof.

TABLE 1

| Difference in speeds between outer cylinder 7 and nut 6 | Direction of rotation of nut 6 | Motion of shaft 4 |
|---|---|---|
| Outer cylinder 7 > nut 6 | Clockwise | Moves down while rotating clockwise |
| Outer cylinder 7 = nut 6 | Clockwise | Rotates clockwise (no upward or downward movement) |
| Outer cylinder 7 < nut 6 | Clockwise | Moves up while rotating clockwise |
| Outer cylinder 7 > nut 6 | Counter-clockwise | Moves down while rotating clockwise at a large speed |
| Outer cylinder 7 = nut 6 | Counter-clockwise | Moves down while rotating clockwise at a large speed |
| Outer cylinder 7 < nut 6 | Counter-clockwise | Moves down while rotating clockwise at a large speed |
| Nut 6 is stopped | | Moves down while rotating clockwise |

TABLE 2

| Difference in speeds between outer cylinder 7 and nut 6 | Direction of rotation of nut 6 | Motion of shaft 4 |
|---|---|---|
| Outer cylinder 7 > nut 6 | Clockwise | Moves up while rotating counter-clockwise at a speed |
| Outer cylinder 7 = nut 6 | Clockwise | Moves up while rotating counter-clockwise at a large speed |
| Outer cylinder 7 < nut 6 | Clockwise | Moves up while rotating counter-clockwise at a large speed |
| Outer cylinder 7 > nut 6 | Counter-clockwise | Moves up while rotating counter-clockwise |
| Outer cylinder 7 = nut 6 | Counter-clockwise | Rotates counter-clockwise (no downward or upward movement) |
| Outer cylinder 7 < nut 6 | Counter-clockwise | Moves down while rotating counter-clockwise |
| Nut 6 is stopped | Stopped | Moves up while counter-clockwise |

TABLE 3

| Rotation of outer cylinder 7 | Direction of rotation of nut 6 | Motion of shaft 4 |
|---|---|---|
| Stopped | Clockwise | Moves up |
| Stopped | Stopped | Stops |
| Stopped | Counterclockwise | Moves down |

Figure 7:
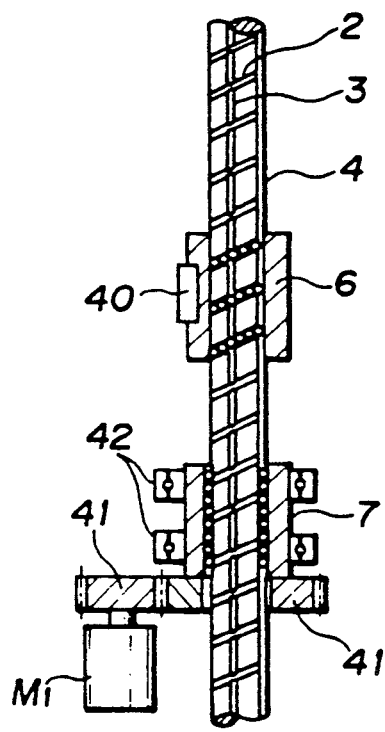
FIGS. 7 and 8 schematically show the structures of other motion guiding apparatus which employ the composite motion guiding unit according to the first invention.

FIG. 7 shows in a schematical manner another motion guiding apparatus which employs the composite motion guiding unit according to the present invention. Like reference numerals designate parts which correspond to those of the composite motion guiding unit shown in FIG. 1, description of these parts being omitted. In this apparatus, the ball screw nut 6 is fixed by a means of key 40, and the ball spline outer cylinder 7 alone is rotatable. The outer cylinder 7 is driven by a motor $M_1$ through gears 41 coupled to the outer cylinder 7. Therefore, when the outer cylinder 7 is rotated, the shaft 4 is rotated through the ball spline grooves 3. Movement of the shaft 4 relative to the nut 6 fixed by means of the key causes the shaft to move up or down. Reference numerals 42 denote bearings for supporting the outer cylinder 7 on a support member (not shown).

Figure 8:
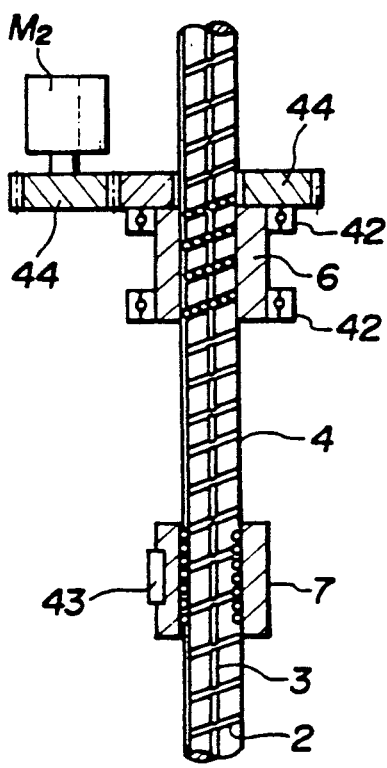

FIG. 8 shows in a schematical manner still another composite motion guiding apparatus which employs the composite motion guiding unit according to the present invention. Like reference numerals designate parts which correspond to those of the composite motion guiding unit shown in FIG. 1, description of these parts being omitted. In this apparatus, the ball spline outer cylinder 7 is fixed by a means of key 43, whereas the ball screw nut 6 is coupled to a motor $M_2$ through gears 44 by which it is driven such as to move the shaft 4 up or down without rotating it.

In one of the aspects of the present invention, one shaft serves as both of a ball spline and a ball screw. This enables a reduction in the number of parts needed in an apparatus which requires both the functions of a ball spline and that of a ball screw, thereby enabling the structure of the apparatus to be simplified. Further, since the ball screw rolling grooves and the ball spline ball rolling grooves are provided in the same portion of one shaft, the effective distance, i.e., the guide stroke, can be assured without any need to increase the length of the shaft, thereby allowing the overall size of the apparatus to be reduced.

In another aspect of the present invention, various types of motion of the shaft, i.e., rotational motion, reciprocative motion, and a composite motion of rotational and linear motions, are provided by operating either of the drive means for rotating the ball spline outer cylinder or that of the ball screw nut, or both of them together.

What is claimed is:

1. A composite motion guiding unit comprising:
   a shaft provided with helical ball screw grooves formed in an outer peripheral surface thereof and ball spline grooves formed in the outer peripheral surface thereof so as to extend in an axial direction of the shaft across the ball screw grooves, said ball screw grooves and said ball spline grooves having groove depths equal to each other;
   a ball screw nut mounted on said shaft and provided with ball rolling grooves being engageable with said ball screw grooves through loaded balls;
   a ball spline outer cylinder mounted on said shaft and provided with ball rolling grooves being engageable with said ball spline grooves through loaded balls;
   a retainer means disposed in a bore of said outer cylinder, said retainer means being of a thin-walled cylindrical form and having slits disposed parallel to the ball spline grooves, the slits defined by parallel opposed curved surfaces for receiving and guiding loaded balls in the longitudinal direction of the shaft, the opposed curved surfaces being defined by a diameter substantially equal to an outer diameter of the balls; and
   a number of balls rolling in said ball screw grooves and said ball spline grooves.

2. The composite motion guiding unit according to claim 1 wherein each of said balls contact at two points to each of said ball rolling grooves with a predetermined contact angle.

3. The composite motion guiding unit according to claim 2 wherein said contact angle is set at about 45°.

4. A composite motion guiding apparatus comprising:
a shaft provided with helical ball screw grooves formed in an outer peripheral surface thereof and ball spline grooves formed in the outer peripheral surface thereof so as to extend in an axial direction of the shaft across the ball screw grooves, said ball screw grooves and said ball spline grooves having groove depths equal to each other;
a ball screw nut mounted on said shaft and provided with ball rolling grooves being engageable with said ball screw grooves through loaded balls;
a ball spline outer cylinder mounted on said shaft and provided with ball rolling grooves being engageable with said ball spline grooves through loaded balls;
a retainer means disposed in a bore of said ball spline outer cylinder, said retainer means being of a thin-walled cylindrical form and having slits disposed parallel to the ball spline grooves, the slits defined by parallel opposed curved surfaces for receiving and guiding loaded balls in the longitudinal direction of the shaft, the opposed curved surfaces being defined by a diameter substantially equal to an outer diameter of the balls;
a number of balls rolling in said ball screw grooves and said ball spline grooves;
a housing to which said ball screw nut and said ball spline outer cylinder are supported to be rotatable respectively;
a first driving means for rotating said ball screw nut; and
a second driving means for rotating said ball spline outer cylinder.

* * * * *